United States Patent
Utsumi et al.

(10) Patent No.: US 6,850,293 B2
(45) Date of Patent: *Feb. 1, 2005

(54) LIQUID CRYSTAL DISPLAY WITH ABSORBER HAVING ABSORPTION AND PERMEABILITY CHARACTERISTICS

(75) Inventors: Yuka Utsumi, Hitachi (JP); Ikuo Hiyama, Hitachinaka (JP); Shinichi Komura, Hitachi (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/692,931

(22) Filed: Oct. 27, 2003

(65) Prior Publication Data

US 2004/0085494 A1 May 6, 2004

Related U.S. Application Data

(63) Continuation of application No. 09/956,138, filed on Sep. 20, 2001, now Pat. No. 6,646,699.

(30) Foreign Application Priority Data

Feb. 9, 2001 (JP) ........................ 2001-034014

(51) Int. Cl.[7] ...................... G02F 1/1335; G02F 1/1343
(52) U.S. Cl. ........................... 349/104; 349/62; 349/65; 349/106; 349/141
(58) Field of Search ............................. 349/62, 65, 70, 349/104, 106, 141

(56) References Cited

U.S. PATENT DOCUMENTS

| | | | |
|---|---|---|---|
| 5,568,267 A | * 10/1996 | Sunamori et al. | 356/416 |
| 5,754,262 A | 5/1998 | Lengyel | 349/104 |
| 5,834,122 A | * 11/1998 | Teng et al. | 428/412 |
| 6,018,421 A | * 1/2000 | Cushing | 359/589 |
| 6,297,907 B1 | 10/2001 | Wang | 359/585 |
| 6,437,840 B1 | 8/2002 | Arikawa et al. | 349/62 |
| 2001/0002146 A1 | 5/2001 | Komatsu | 349/141 |
| 2001/0038425 A1 | 11/2001 | Lee | 349/61 |
| 2001/0052955 A1 | 12/2001 | Nagatani | 349/65 |

FOREIGN PATENT DOCUMENTS

| | | |
|---|---|---|
| JP | 2-97992 | * 4/1990 |
| JP | 3-206720 | 12/1991 |
| JP | 3-282417 | * 12/1991 |
| JP | 8-015697 | 1/1996 |
| JP | 10-170923 | 6/1998 |
| JP | 2000-19543 | 1/2000 |
| JP | 2000-206544 | 7/2000 |

* cited by examiner

*Primary Examiner*—Tarifur R. Chowdhury
(74) *Attorney, Agent, or Firm*—Antonelli, Terry, Stout & Kraus, LLP

(57) ABSTRACT

A liquid crystal display for displaying an image to be visible for a viewer, has a liquid crystal, a pair of electrodes for controlling an orientation of at least a part of the liquid crystal in accordance with an electric field between the electrodes, a light source for generating a light to be transmitted through the liquid crystal to the viewer, a pair of first and second polarizer plates, the first polarizer plate being arranged between the liquid crystal and the light source, and the second polarizer plate being arranged between the liquid crystal and the viewer, and a band-pass filter for absorbing a component of the light, a wave-length of which component is not more than 440 nm, and the band-pass filter being arranged between the light source and the viewer.

5 Claims, 15 Drawing Sheets

LIQUID CRYSTAL DISPLAY WITH ABSORBER HAVING ABSORPTION AND PERMEABILITY CHARACTERISTICS

CROSS REFERENCE TO RELATED APPLICATION

This is a continuation of U.S. application Ser. No. 09/956,138, filed Sep. 20, 2001, now U.S. Pat. No. 6,646,699, the subject matter of which is incorporated by reference herein.

BACKGROUND OF THE INVENTION AND RELATED ART STATEMENT

The present invention relates to a liquid crystal display for displaying an image to be visible for a viewer.

JP-A-8-015697 discloses that a color toner adjuster for adjusting a color tone of a light as a back light generated by a fluorescent light source is arranged between the fluorescent light source and a light guide for distributing constantly the back light over a liquid crystal display panel in a STN type liquid crystal display unit.

JP-A-2000-206544 discloses that an unevenness in an image to be displayed is restrained by preventing a liquid crystal from being contaminated by a liquid crystal cell sealing resin before being cured, in an active matrix in-plain switching mode liquid crystal display in which a pair of comb-shaped electrodes is used.

JP-A-2000-19543 discloses a method for restraining an unevenness in an image caused by an error in dimension of electrodes.

JP-A-10-170923 discloses that a twisted connection between a liquid crystal molecule and a directing layer surface at the interface therebetween is made weak to decrease the unevenness in the image caused by an error in distance between substrates between which the liquid crystal is arranged.

OBJECT AND SUMMARY OF THE INVENTION

An object of the present invention is to provide a liquid crystal display for displaying an image to be visible for a viewer, in which a so-called blue fog phenomenon is restrained even when a brightness of the image is low. The lower a voltage for controlling an orientation of a liquid crystal is, the higher a permeability of the liquid crystal for a blue color light is. When the voltage for controlling the orientation of the liquid crystal is close to a threshold voltage of the liquid crystal so that a transmittance of the liquid crystal for the light is low, that is, a brightness of the display is low, a light of wave-length 400–440 nm as a blue color light is more effectively transmitted through the liquid crystal in comparison with another light of wave-length not less than 440 nm, and a difference in brightness and a difference in color can be clearly visible. Therefore, the so-called blue fog phenomenon occurs.

According to the invention, a liquid crystal display for displaying an image to be visible for a viewer, comprises, a liquid crystal, a pair of electrodes for controlling a molecular orientation of at least a part of the liquid crystal in accordance with an electric field between the electrodes, a light source for generating a light to be transmitted through the liquid crystal to the viewer, a pair of first and second polarizer plates, the first polarizer plate being arranged between the liquid crystal and the light source, and the second polarizer plate being arranged between the liquid crystal and the viewer, and a band-pass filter for absorbing a component of the light, a wave-length of which component is not more than 440 nm, and the band-pass filter being arranged between the light source and the viewer.

Since the band-pass filter for absorbing the component of the light, a wave-length of which component is not more than 440 nm, is arranged between the light source and the viewer, when the voltage for controlling the molecular orientation of the liquid crystal is close to a threshold voltage of the liquid crystal so that a transmittance of the liquid crystal for the light is low, that is, a brightness of the display is low, and a light of wave-length 400–440 nm as a blue color light is more effectively transmitted through the liquid crystal in comparison with another light of wave-length not less than 440 nm, the light of wave-length 400–440 nm as the blue color light is restrained from reaching the viewer, so that the so-called blue fog phenomenon is prevented.

In order to generate correctly another color visible for the viewer while the so-called blue fog phenomenon is prevented, it is preferable that a transmittance of the band-pass filter for the component of wave-length not more than 440 nm is smaller than a transmittance of the band-pass filter for another component of the light, a wave-length of which another component is not less than 450 nm, that a transmittance of the band-pass filter for the component of wave-length 400–440 nm is smaller than a transmittance of the band-pass filter for another component of the light, a wave-length of which another component is not less than 450 nm, that a transmittance of the band-pass filter decreases in accordance with a decrease of a wave-length of a light to be transmitted through the band-pass filter when the wave-length of the light to be transmitted through the band-pass filter is less than 450 nm, and/or that a transmittance of the band-pass filter decreases in accordance with a decrease of a wave-length of a light to be transmitted through the band-pass filter when the wave-length of the light to be transmitted through the band-pass filter is 400–440 nm.

The band-pass filter may be arranged between the light source and a light guide for guiding the light from the light source to the liquid crystal to distribute the light evenly over the liquid crystal. When a diffusing plate for distributing constantly the light over the liquid crystal is arranged between the light guide and the liquid crystal, and the band-pass filter may be arranged between the diffusing plate and the light guide. The band-pass filter may be arranged on the light source. The band-pass filter may be arranged on the light guide. When the liquid crystal display comprises a pair of first and second substrates being at least partially transparent and the liquid crystal is arranged between the first and second substrates, the band-pass filter may be arranged on at least one of the first and second substrates. The band-pass filter may be arranged on at least one of the first and second polarizer plates. The band-pass filter is preferably arranged between the light source and the liquid crystal.

When the liquid crystal display comprises a color filter including a portion for transmitting therethrough a blue light, the portion includes an agent for absorbing the component of the light as the band-pass filter.

The band-pass filter may be a stack of layers. The band-pass filter may be a polymer for absorbing the component of the light. The band-pass filter may be a resin including an agent for absorbing the component of the light.

The light source may include a fluorescent substance for generating the light. The liquid crystal and the pair of first and second polarizer plates may form a normally close type liquid crystal display unit. A direction in which the light is transmitted in the liquid crystal may be prevented from being parallel to a direction in which the electric field is generated or may be transverse with respect to the direction in which the electric field is generated. The liquid crystal and the pair of first and second polarizer plates may form a super twisted nematic type liquid crystal display unit.

DETAILED DESCRIPTION OF PREFERRED EMBODIMENTS

Figure 1:
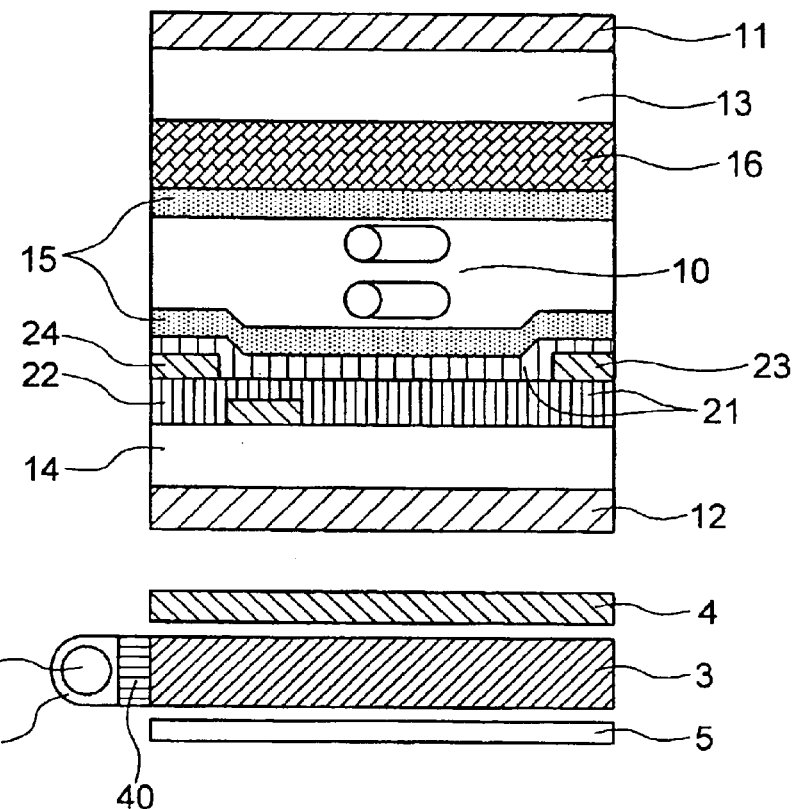
FIG. 1 is a cross-sectional view showing a liquid crystal display of in-plane switching mode of the invention.

In a liquid crystal display of in-plane switching mode, as shown in FIG. 1, a back-light light source unit has a light source 1, a cover 2, a light guide 3, a diffusing plate 4, and a reflection plate 5. An adhesive layer (not shown) adheres to the light guide 3 and the diffusing plate 4 to prevent a loss of light through an air between the light guide 3 and the diffusing plate 4. A light collector sheet may be arranged between the diffusing plate 4 and a polarizer plate 12. In this embodiment, a spectrum absorber 40 is arranged between the light source 1 and the light guide 3. The spectrum absorber 40 is a band-pass filter including a plurality of stacks of layers for absorbing a visible light of wavelength 400–440 nm. A liquid crystal display panel of in-plan switching mode in which an electric field applied to a liquid crystal layer 10 is substantially parallel to a substrate is used as a normally-close type liquid crystal display utilizing birefringence of the first embodiment. In the liquid crystal display panel, the liquid crystal layer 10 is arranged between substrates 13 and 14, and the substrates 13 and 14 are arranged between the polarizer plates 11 and 12.

An inner surface of the substrate 14 has stripe-shaped electrodes 22 and 23, and a alignment layer 15 covering the electrodes 22 and 23. The electrode 22 is a common electrode to which a voltage of predetermined wave form other than an image signal voltage is applied, and the electrode 23 is an image pixel electrode to which a wave form of voltage changeable in accordance with the image signal is applied. An image signal electrode 24 is arranged at the same height as the image pixel electrode 23. An insulating layer 21 of silicon-nitride is formed between the electrodes. The substrate 13 has a color filter 16 for multi-color display. The color filter 16 may be formed on the substrate 14 with the electrodes. The alignment layer 15 is formed by coating the substrate with a solution of 3% concentration poly-amicacid, baking the poly-amicacid under 200 □ for 30 minutes to be changed to a polyimide layer, and rubbing a surface of the polyimide layer. The alignment layer 15 may be formed by being irradiated with a polarized ultraviolet rays.

Figure 2:
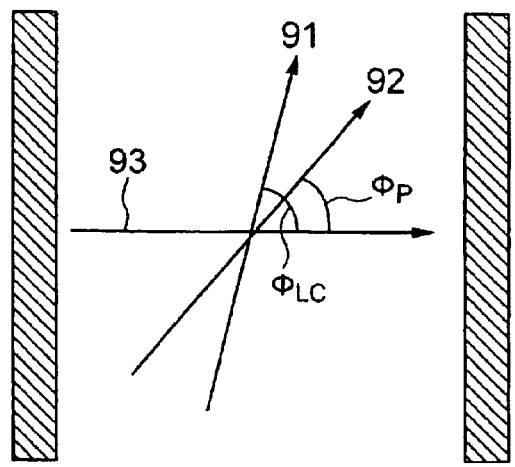
FIG. 2 is a schematic view showing an angular relationship among an alignment direction of long axis of liquid crystal molecule, a direction of electric field and a polarized light transmitted axis of a polarizer plate.
Figure 3A:
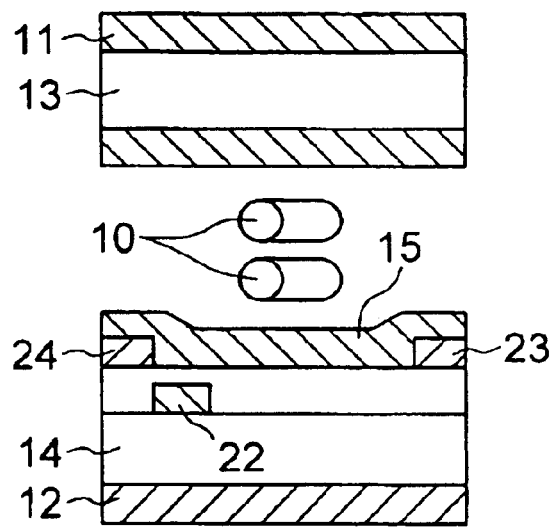
FIGS. 3a–3d are views showing a change of the alignment direction of long axis of liquid crystal molecule by the electric field.
Figure 3B:
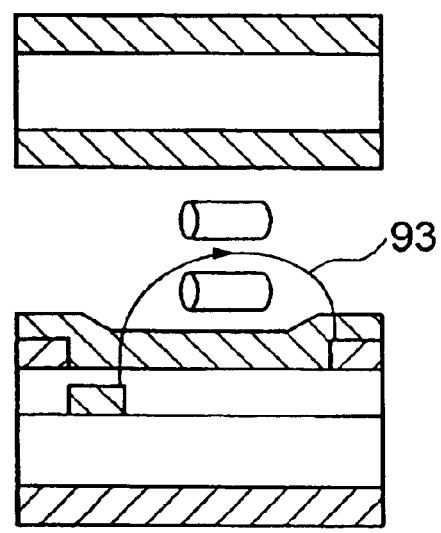
Figure 3C:
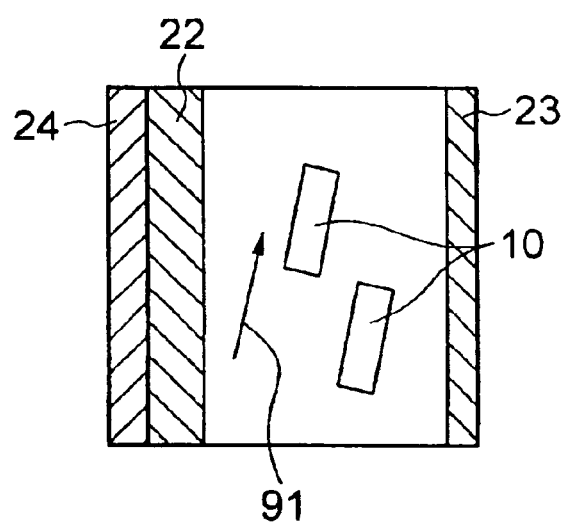
Figure 3D:
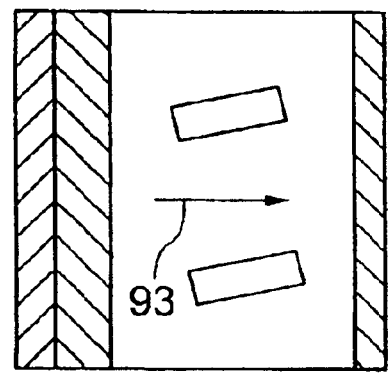

FIG. 2 shows a relationship in angle among the electric field 93, a long axis 91 of liquid crystal molecule, and a polarized light transmitted axis 92 of the polarizer plate. The polarizing directions of the polarizer plates 11 and 12 are perpendicular to each other to form the normally-close type liquid crystal display utilizing birefringence. A luminous intensity of the transmitted light is calculated by the following formula wherein $\Delta n$ is an anisotropy in refractive index, $\theta$ is an angle between the polarized light permeable axis and the long or effective axis 91 of liquid crystal molecule, $d_{eff}$ is a thickness of the liquid crystal layer, $T_0$ is a coefficient determined in accordance with a permeability of light of the polarizer plate, and $\lambda$ is a wave length of the light to be transmitted.

$$T=T_0 \cdot \sin^2 2\theta \cdot \sin^2[(\pi \cdot d_{eff} \cdot \Delta n)/\lambda]$$

The liquid crystal layer 10 is a nematic liquid crystal of positive anisotropy in dielectric constant, the anisotropy in dielectric constant is 10.2, and the anisotropy in refractive index $\Delta n$ is 0.073.

A permeability of light of the liquid crystal layer 10 is changed as shown in FIG. 3. Areas (a) and (b) show a non-energized condition, and areas (b9 and (d) show an energized condition in which the angle $\theta$ between the long or effective axis 91 of liquid crystal molecule and the polarized light permeable axis 92 of the polarizer plate is changed by the electric field 93.

Figures 4A, 4B, 4C:
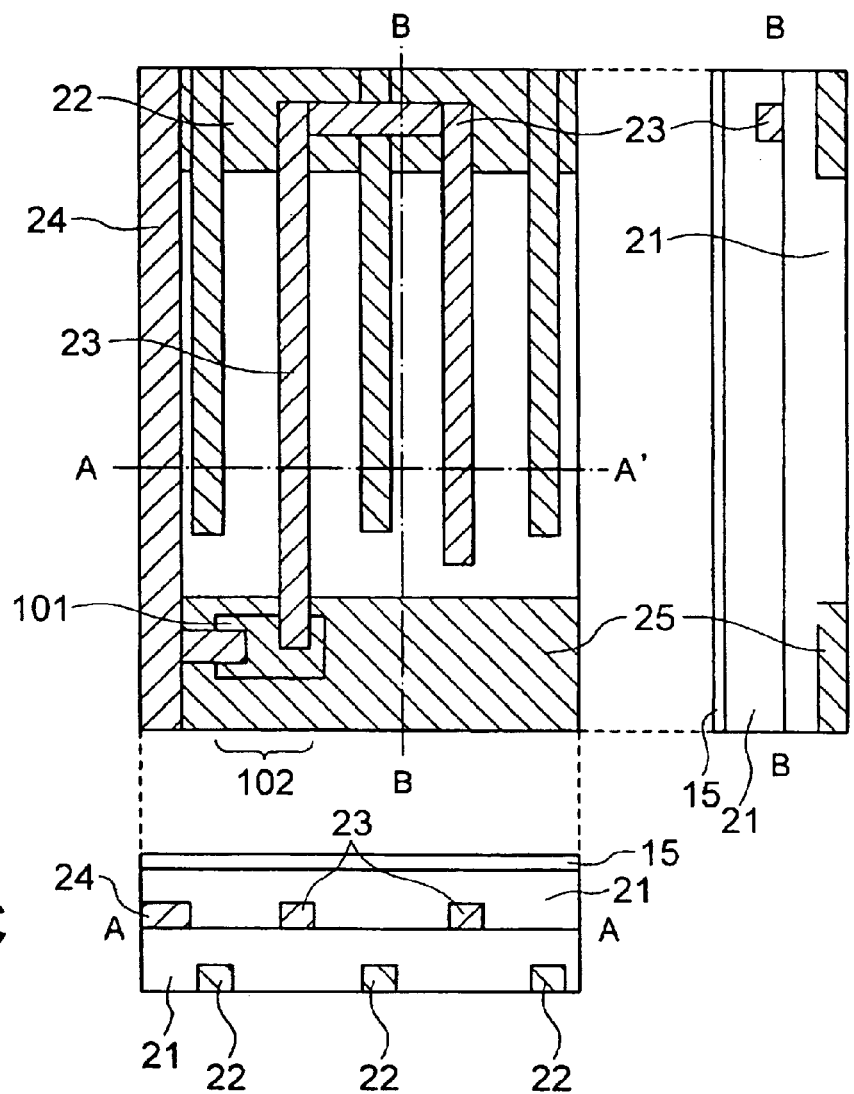
FIGS. 4a–4c are detailed views showing electrodes, insulating layers, and alignment layers.

As shown in FIG. 4, The inner surface of the substrate 14 has the stripe-shaped electrodes 22 and 23, and the image signal electrodes 24 is arranged at the same height as the electrode 23 on the inner surface of the substrate 14. A scanning electrode (gate wiring electrode) 25 extends perpendicularly to the image signal electrodes 24. The alignment layer 15 is formed on the electrodes. An area on the substrate includes both an amorphous-silicon area 101 and a TFT element 102.

Figure 5:
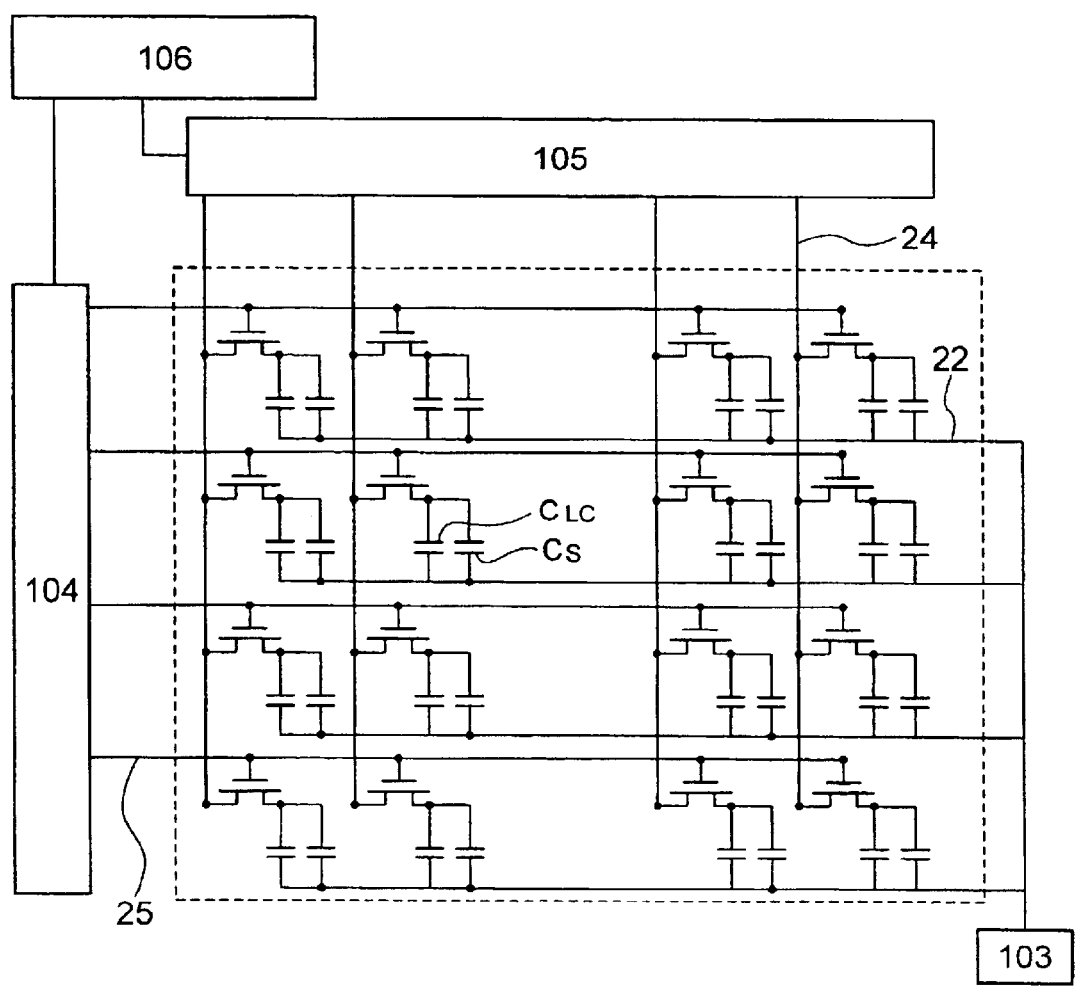
FIG. 5 is a diagram showing a crystal liquid driving circuit.

As shown in FIG. 5, a liquid crystal display driver includes, for example, a common electrode driver circuit 103, a vertical scanning signal circuit 104, an image signal circuit 105 and an electric source and controller circuit 106.

Figure 6:
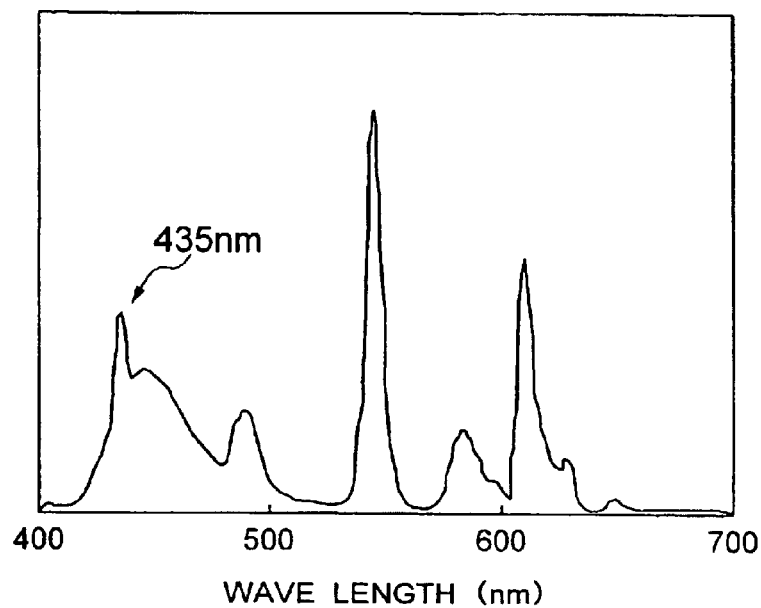
FIG. 6 is a diagram showing a spectrum generated by a cold cathode of narrow band light emitting type.

FIG. 6 shows a spectrum generated by a cold cathode of narrow band light emitting type having a spectrum characteristic of a three band fluorescent light source. A peak in the spectrum is generated at a wave-length of 435 nm when this type fluorescent light source including mercury for energizing phosphor is used. In order to restrain a blue fog phenomenon in the liquid crystal display, the peak in the spectrum needs to be absorbed. Therefore, the band-pass filter 40 is arranged between the cold cathode of narrow band light emitting type 1 and the light guide 3. A plurality of sets each including a low refractive index dielectric layer such as magnesium-fluoride, silicon-oxide or the like, and a high refractive index dielectric layer such as zirconium-oxide, titanium-oxide or the like are stacked by a vapor deposition process until a number of layers reaches 6–20.

Figure 7:
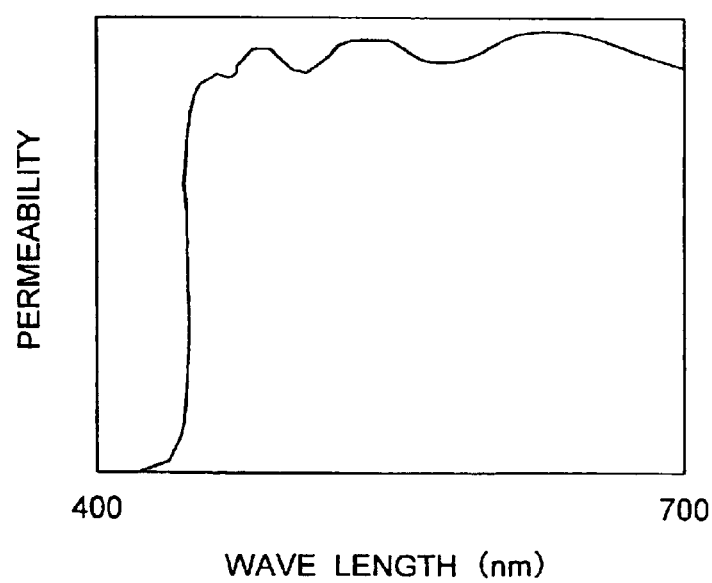
FIG. 7 is a diagram showing a relationship between a wave length of a light and a band-pass filter therefor of the invention.

As shown in FIG. 7, the band-pass filter 40 absorbs effectively a light of wave-length not more than 440 nm, so that the blue fog phenomenon is restrained.

Figure 8:
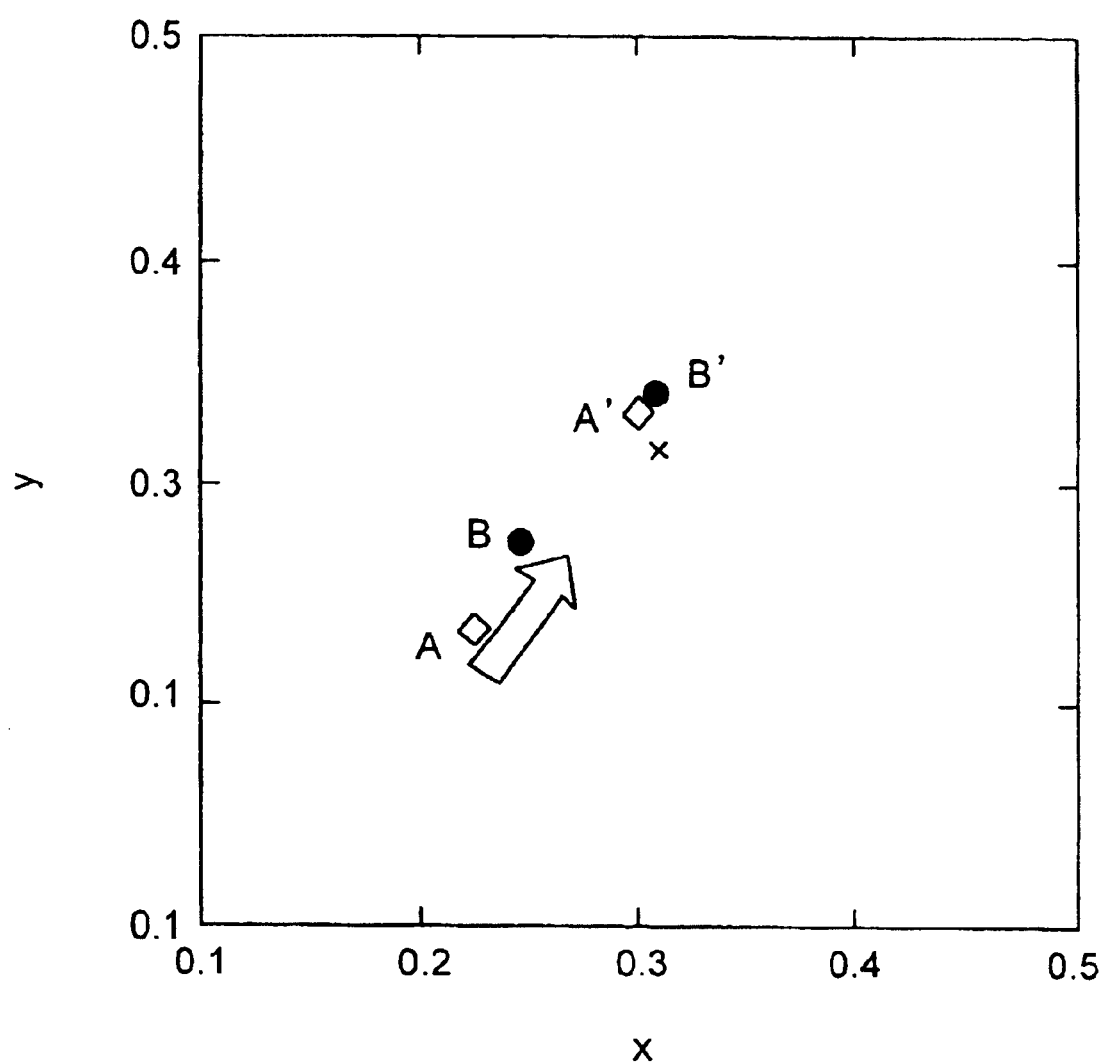
FIG. 8 is a chromaticity diagram according to CIE1931 of the international illumination committee, showing differences in color.

In a chromaticity diagram as shown in FIG. 8 according to CIE1931 of the international illumination committee, a point A indicates to a chromaticity obtained by the prior art normally-close transverse electric field type liquid crystal display when a dark color is generated, and a point B indicates to a chromaticity obtained by the in-plane switching mode type liquid crystal display of the invention with the band-pass filter 40 when the dark color is generated. A point A' indicates to a chromaticity obtained by the prior art normally-close in-plane switching mode liquid crystal display when a bright color is generated, and a point B' indicates to a chromaticity obtained by the in-plane switching mode liquid crystal display of the invention with the band-pass filter 40 when the bright color is generated. A point x indicates to a chromaticity of sun-light. An area of relatively small values of x and y corresponds to a relatively blue color, and an area of relatively large values of x and y corresponds to a relatively yellow color. The point A shows that the prior art normally-close transverse electric field type liquid crystal display emphasizes strongly the blue color, and the point B shows that the invention restrains the blue color from being emphasized. The points A' and B' show that the chromaticity by the transverse electric field type liquid crystal display of the invention and the prior art normally-close in-plane switching mode type liquid crystal display are not different largely from each other when the bright color is generated. Therefore, the transverse electric field type liquid crystal display of the invention with the band-pass filter 40 restrains only the blue fog phenomenon, but does not have a large influence for the bright color indication. The band-pass filter 40 absorbs strongly the light of wave-length not more than 440 nm, but restrains the light of wave-length preferably more than 440 nm or practically not less than 450 nm from being absorbed strongly by the band-pass filter 40.

Figure 9:
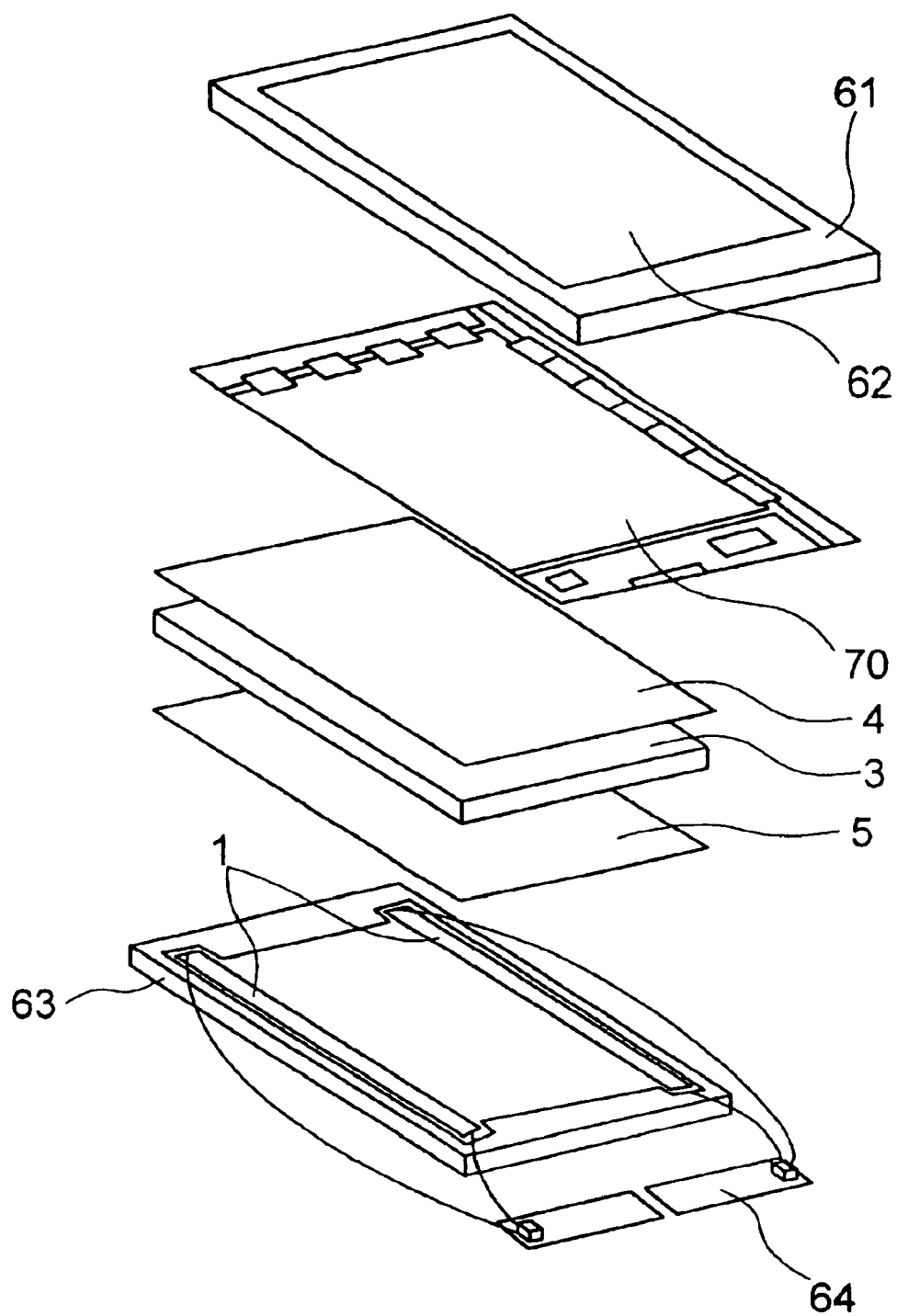
FIG. 9 is an oblique projection view showing the liquid crystal display of in-plane switching mode liquid crystal display apparatus of the invention.

As shown in FIG. 9, the light sources 1 are arranged at respective sides of a lower case 63 with an inverter drive circuit 64. The reflecting plate 5, the light guide 4, the diffusion plate 4 and the liquid crystal display panel 70 are mounted on the lower case 63. An upper side of the lower case 63 is covered by a shield case 61 having a display window.

The light of wave-length not more than 440 nm does not have a large influence for brightness. On the other hand, a permeability of the light of wave-length 400–440 nm is high when a brightness of the normally-close in-plane switching mode liquid crystal display is low, and is low when a brightness of the normally-close in-plane switching mode liquid crystal display is high. Therefore, the blue fog phenomenon occurs and the brightness of display is not changed largely by the light of wave-length not more than 440 nm when brightness of the normally-close in-plane switching mode liquid crystal display is low, and the brightness of display is not changed largely by the light of wave-length not more than 440 nm when brightness of the normally-close in-plane switching mode liquid crystal display is high.

Figure 10:
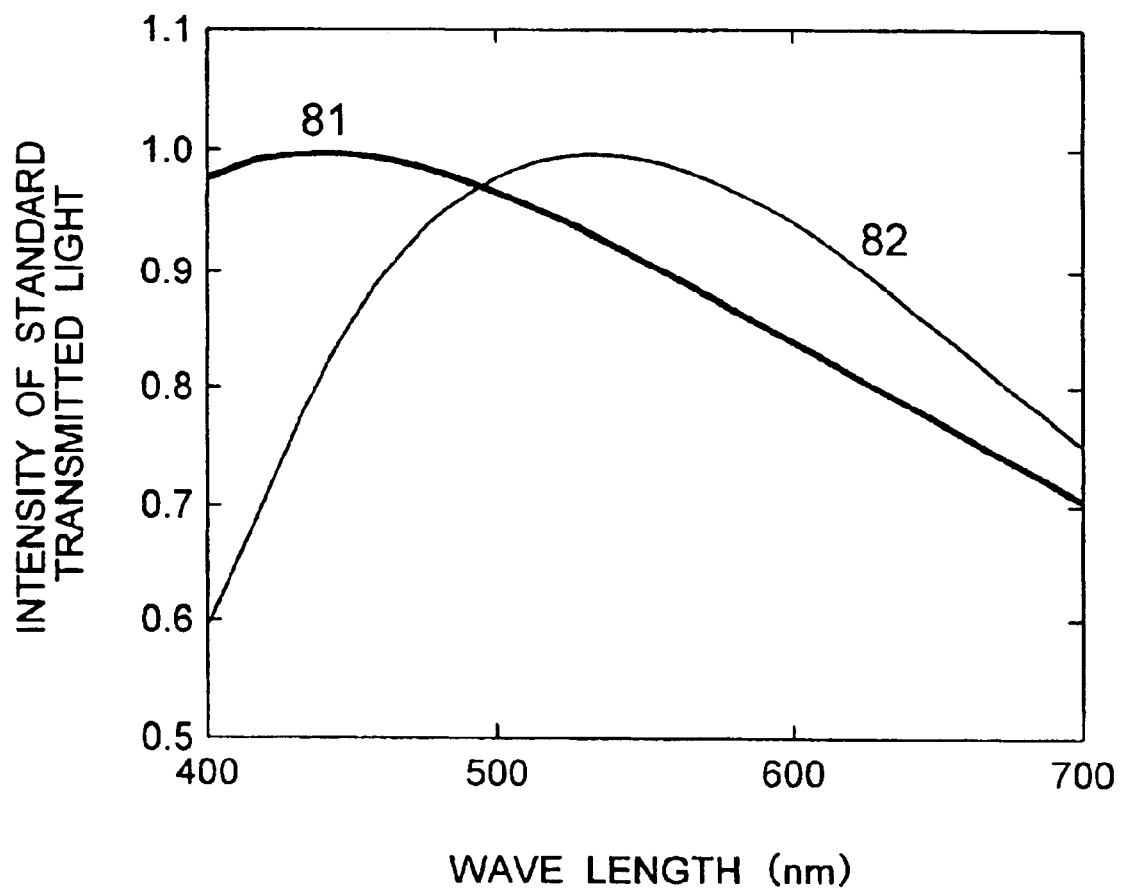
FIG. 10 is a diagram showing a spectral characteristic of the normally-close in-plane switching mode liquid crystal display.

In FIG. 10 showing a spectral characteristic of the normally-close transverse electric field type liquid crystal display, a thick line 81 shows that a permeability of the light of wave-length not more than 440 nm is high and the permeability of the light decreases in accordance with an increase of the wave-length when the brightness is small, and a thin line 82 shows that a permeability of the light of wave-length not more than 440 nm is low and the permeability of the light increases in accordance with an increase of the wave-length when the brightness is high.

Figure 11:
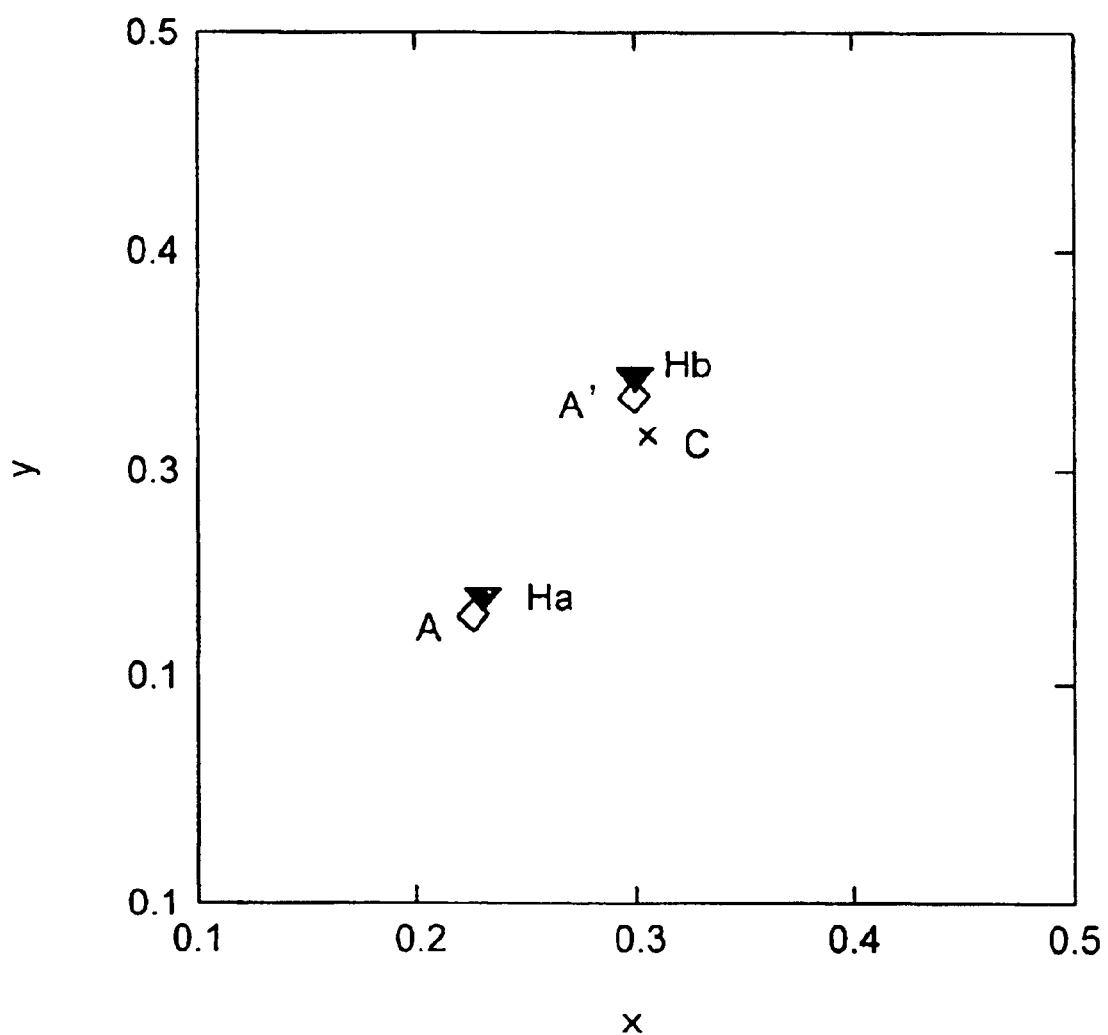
FIG. 11 is a chromaticity diagram according to CIE1931 of the international illumination committee, showing differences in color.

In a chromaticity diagram according to CIE1931 of the international illumination committee, as shown in FIG. 11, a point Ha indicating a chromaticity obtained by the normally-close in-plane switching mode liquid crystal display including the band-pass filter 40 absorbing strongly the light of wave-length not more than 430 nm when the dark color is generated is not different largely from the point A indicating the chromaticity obtained by the prior art normally-close transverse electric field type liquid crystal display when the dark color is generated. Therefore, the normally-close transverse electric field type liquid crystal display including the band-pass filter 40 absorbing strongly the light of wave-length not more than 430 nm cannot restrain effectively the blue fog phenomenon. A point Hob indicating a chromaticity obtained by the normally-close transverse electric field type liquid crystal display including the band-pass filter 40 absorbing strongly the light of wave-length not more than 430 nm when the bright color is generated is not different largely from the point A' indicating the chromaticity obtained by the prior art normally-close transverse electric field type liquid crystal display when the bright color is generated.

Figure 12:
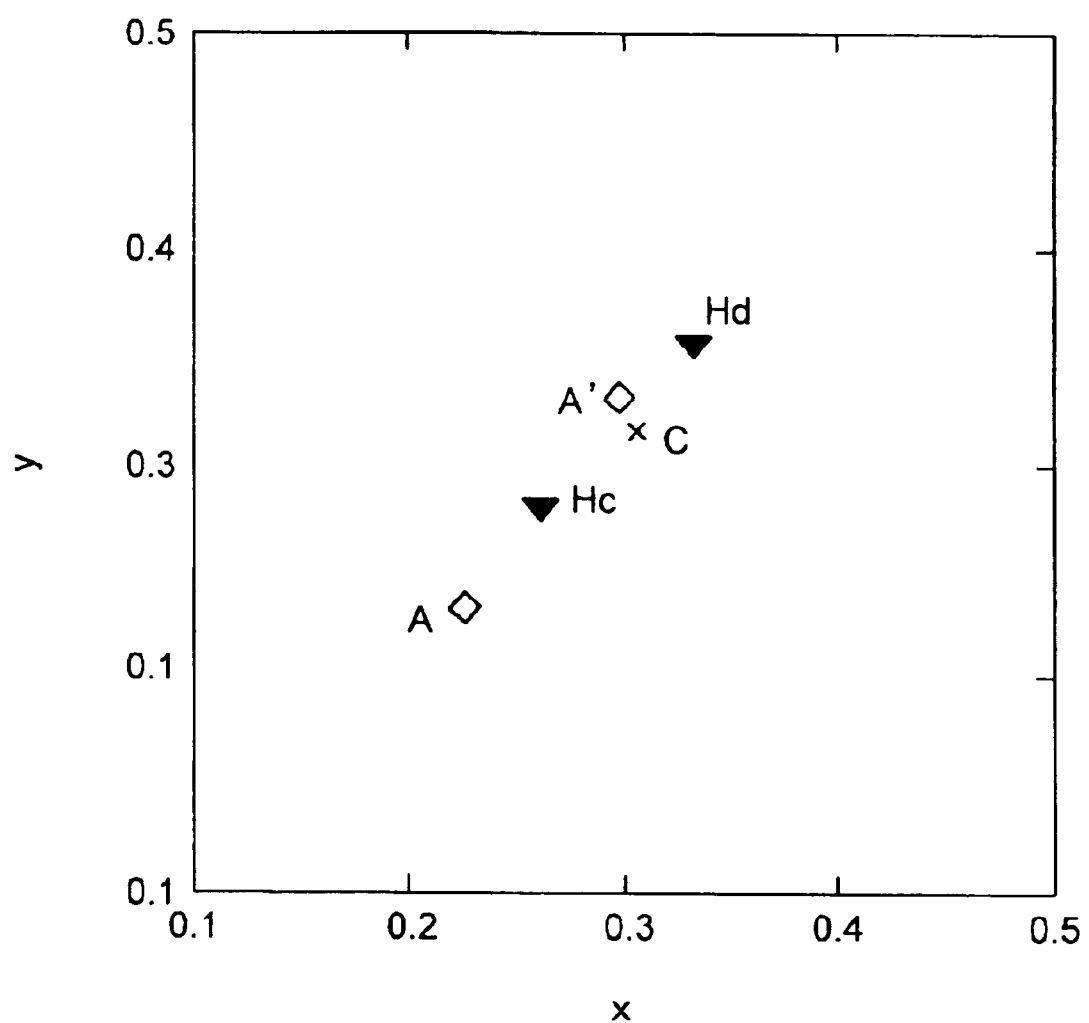
FIG. 12 is a chromaticity diagram according to CIE1931 of the international illumination committee, showing differences in color.

In a chromaticity diagram according to CIE1931 of the international illumination committee, as shown in FIG. 12, a point Chi indicating a chromaticity obtained by the normally-close transverse electric field type liquid crystal display including the band-pass filter 40 absorbing strongly the light of wave-length not more than 450 nm when the dark color is generated is different largely from the point A indicating the chromaticity obtained by the prior art normally-close transverse electric field type liquid crystal display when the dark color is generated. Therefore, the normally-close transverse electric field type liquid crystal display including the band-pass filter 40 absorbing strongly the light of wave-length not more than 450 nm can restrain effectively the blue fog phenomenon. On the other hand, a point Had indicating a chromaticity obtained by the normally-close transverse electric field type liquid crystal display including the band-pass filter 40 absorbing strongly the light of wave-length not more than 450 nm when the bright color is generated is different largely from the point A' indicating the chromaticity obtained by the prior art normally-close transverse electric field type liquid crystal display when the bright color is generated. Therefore, yellow is emphasized in the bright color.

Figure 13:
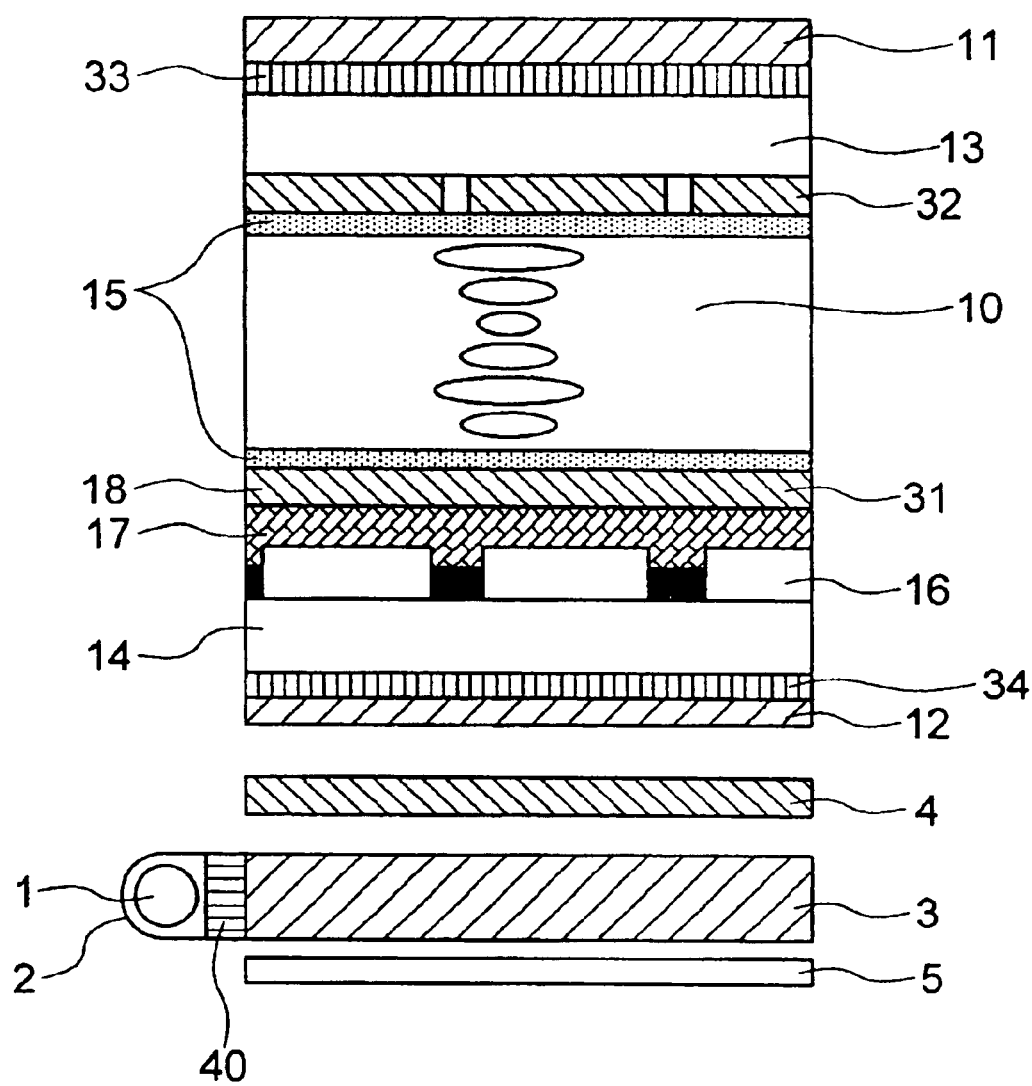
FIG. 13 is a cross-sectional view showing a STN liquid crystal display of normally close type of the invention.

As shown in FIG. 13, a normally close STN type liquid crystal display has a transparent Y electrode on the transparent substrate 13, a transparent X electrode on the transparent substrate 14, the color filter 16, a black matrix 17 and a flattening layer 18. Each of the transparent substrates 13 and 14 between which the liquid crystal 10 is arranged has the directing layer 15 of polyimide whose surface is treated by rubbing. The X and Y electrodes are energized by a driver (not shown). The polarizer plate 11 and a phase plate 33 of polycarbonate are arranged at an outside of the transparent substrate 13, and the polarizer plate 12 and a phase plate 34 of polycarbonate are arranged at an outside of the transparent substrate 14. The phase plate 34 may be arranged between the polarizer plate 11 and the phase plate 33 or between the substrate 13 and the phase plate 33. The liquid crystal layer 10 of thickness 6.2 am is a nematic liquid crystal of positive anisotropy in dielectric constant, and the anisotropy in refractive index Δn is 0.144. The nematic liquid crystal includes a choral agent (such as S811 of Merc Inc.,) to have a twist angle of 240 degrees.

In this case, an azimuth angle of the polarizing axis of the lower polarizer plate 12 is 10 degrees, an azimuth angle of the polarizing axis of the upper polarizer plate 11 is 80 degrees, an azimuth angle of slow axis of the lower phase plate 34 is 110 degrees, an azimuth angle of slow axis of the upper phase plate 33 is 70 degrees, and retardations of the phase plates 33 and 34 are 400 nm. The azimuth angles are set in such a manner that the twist angle is 240 degrees, and rubbed angles of the upper and lower directing layers are ±30 degrees with respect to a longitudinal direction of the liquid crystal display panel. The arrangement of the light source unit and the band-pass filter 40 is the same as the embodiment shown in FIG. 1.

Figure 14:
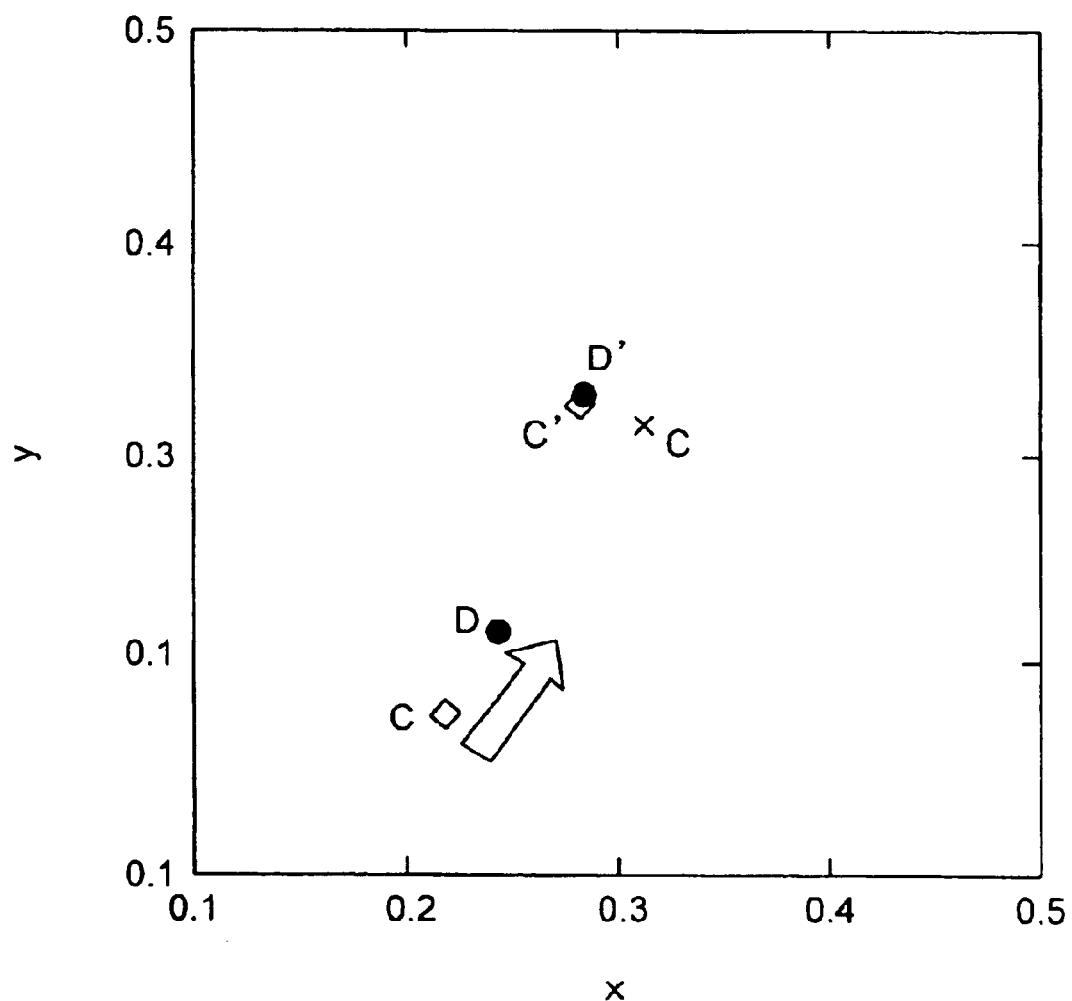
FIG. 14 is a chromaticity diagram according to CIE1931 of the international illumination committee, showing differences in color.

In a chromaticity diagram according to CIE1931 of the international illumination committee, as shown in FIG. 14, the band-pass filter 40 restrains the blue fog phenomenon in the normally close STN type liquid crystal display.

Figure 15:
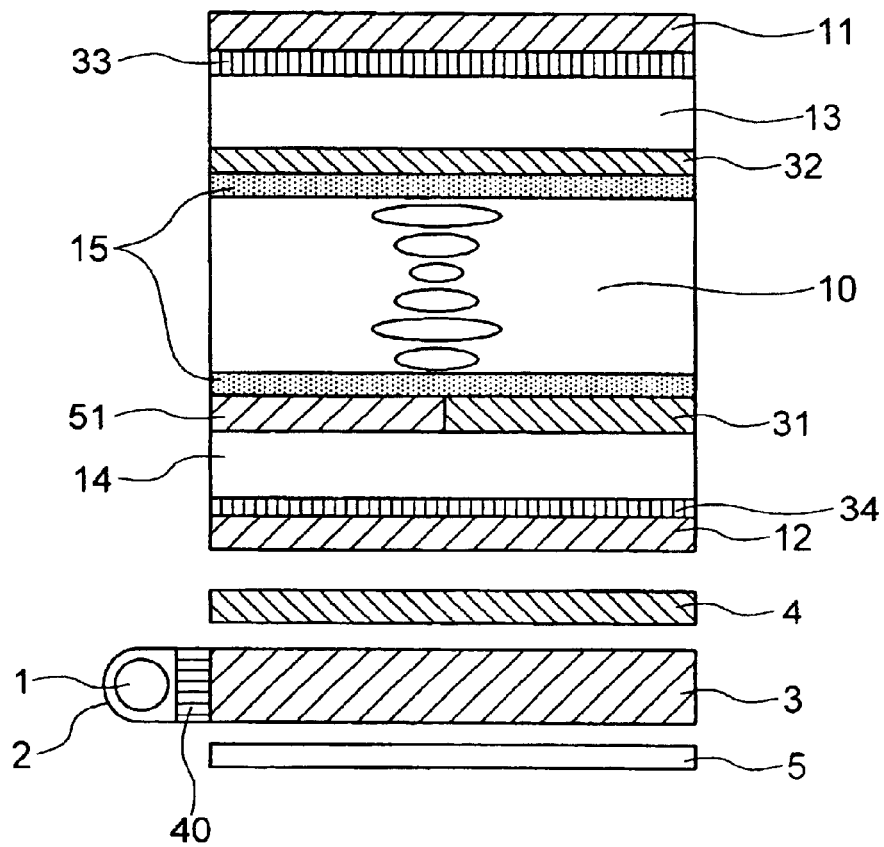
FIG. 15 is a cross-sectional view showing another STN liquid crystal display of reflection and transmission combination type of the invention.

As shown in FIG. 15, a reflection and transmission combination STN type liquid crystal display panel has a transmission area formed by a transparent electrode 31 of, for example, ITO, and a reflection area formed by a reflection electrode 51 of, for example, aluminum in each pixel on the substrate 14. When the electrodes are formed on the substrate, a transparent electrode layer of, for example, ITO is deposited by sputtering process on the transparent substrate 14, and a part of the transparent electrode layer is removed to form a pattern of the transparent electrode layer as the transparent electrode 31. Subsequently, a reflection electrode layer of, for example, aluminum is deposited thereon, and a part of the reflection electrode layer is removed to form a pattern of the reflection electrode layer as the reflection electrode 52. The color filter (not shown) is formed on the substrate.

When this reflection and transmission combination STN type liquid crystal display panel is used with the light source unit and the band-pass filter 40 as described above, the blue fog phenomenon is also restrained effectively. The reflection electrode may be formed on the transparent electrode. The transparent electrode and the reflection electrode may be driven electrically independently of each other.

Figure 16:
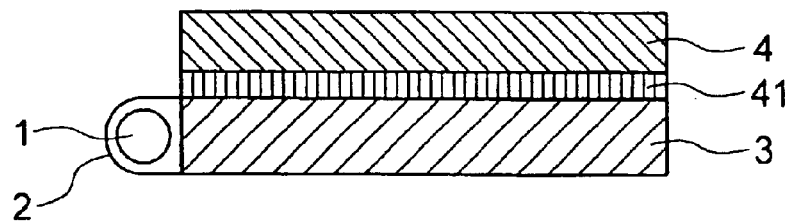
FIG. 16 is a cross-sectional view showing another arrangement of a light guide, a band-pass filter and a diffusion plate.

As shown in FIG. 16, a band-pass filter 41 having the same absorption characteristic for the light as the band-pass filter 40 may be arranged between the light guide 3 and the diffusing plate 4. The fluorescent light source 1 may be arranged under the light guide 3.

An acrylic type polymer layer including cyano-acrylate absorbent may be used as the band-pass filters 40 and 41. The acrylic type polymer layer including cyano-acrylate absorbent may be formed on the light guide 3 by coating a rotated surface of the light guide 3 with the acrylic type polymer layer of monomer condition including cyano-acrylate absorbent, and polymerizing the acrylic type polymer layer of monomer condition including cyano-acrylate absorbent on the surface of the light guide 3. The cyano-acrylate absorbent absorbs effectively the light of wave-length 400–440 nm. The acrylic type polymer layer including cyano-acrylate absorbent may be arranged directly on the three band fluorescent light source 1 or LED. The band-pass filters 40 or 41 may be arranged directly on the three band fluorescent light source 1 or LED. The light source may be formed by a combination of monochromatic red, green blue LEDs.

Figure 17:
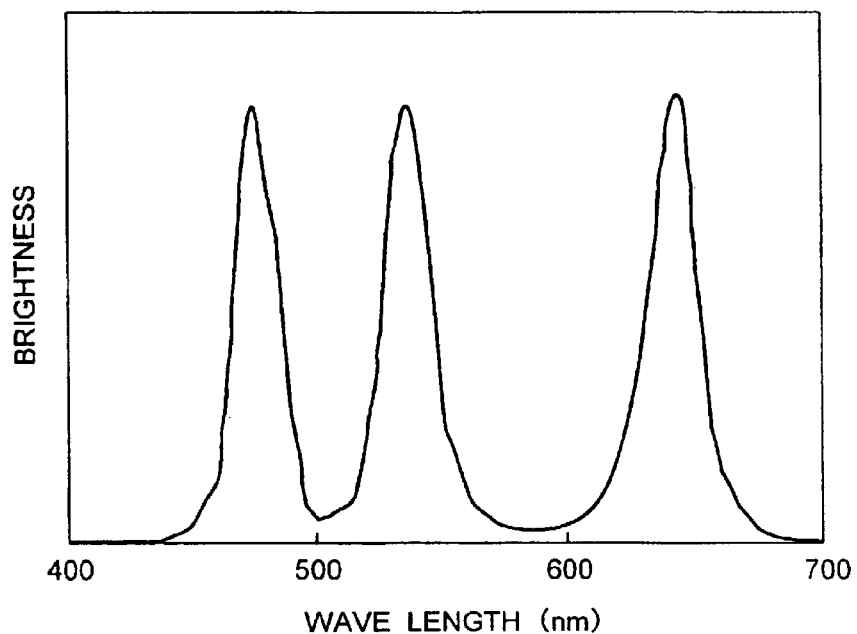
FIG. 17 is a diagram showing a relationship between a brightness and a wave length in red, green and blue light emitting LEDs.
Figure 18:
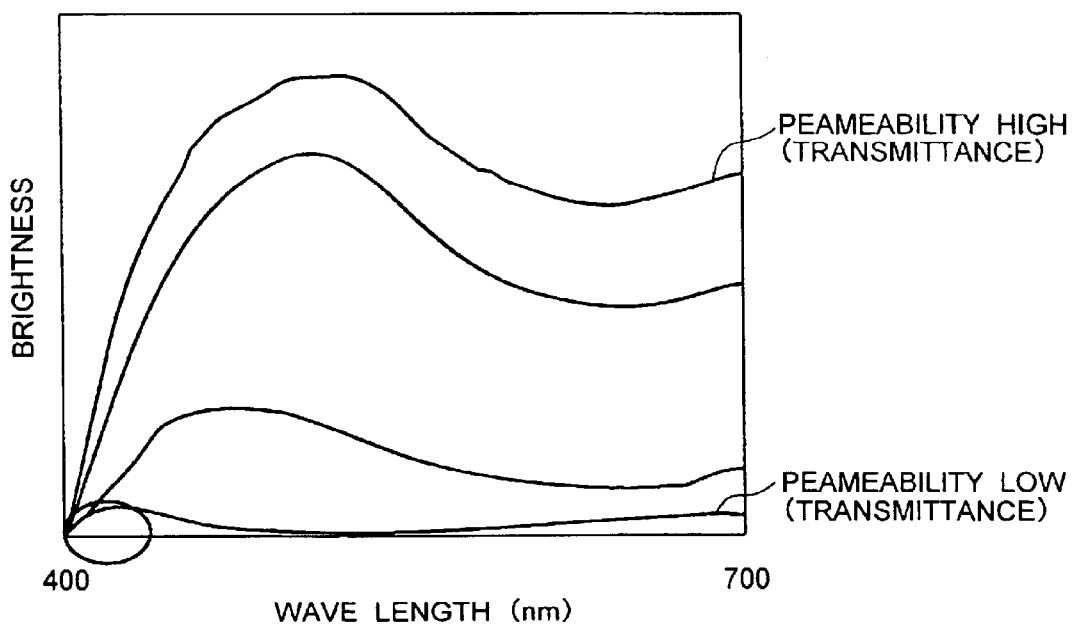
FIG. 18 is a diagram showing a relationship between a brightness and a spectrum in STN liquid crystal display.
Figure 19:
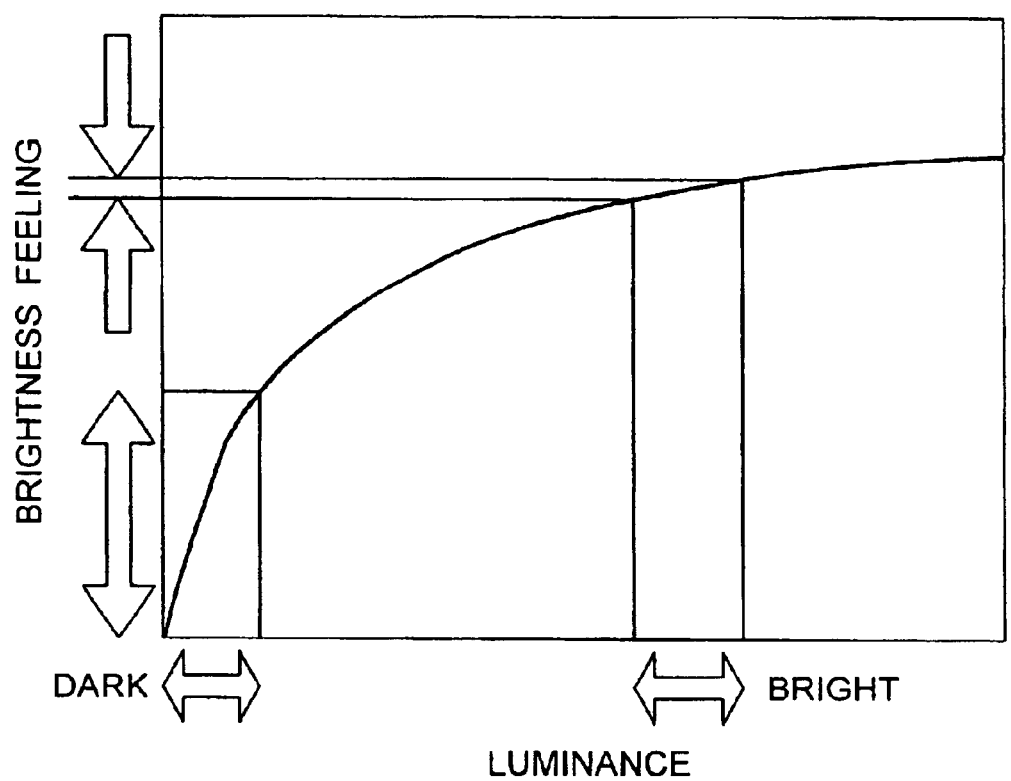
FIG. 19 is a diagram showing a relationship between a brightness feeling and an actual brightness or luminous intensity.

As shown in FIG. 17, the blue LED generates the light of wave-length 450–480 nm, the green LED generates the light of wave-length 520–570 nm, and the red LED generates the light of wave-length 600–660 nm. An extremely small amount of light of wave-length not more than 440 nm is absorbed by the band-pass filters 40 and 41 between the light guide 3 and the diffusing plate 4 to restrain the blue fog phenomenon.

The cyano-acrylate absorbent absorbing effectively the light of wave-length 400–440 nm may be included by the adhesive between the polarizer plate 12 and the phase plate 51 shown in FIG. 15. In this case, the diffusing plate 4 is not necessary.

The acrylic type polymer layer including cyano-acrylate absorbent absorbing effectively the light of wave-length 400–440 nm may be arranged on the substrate 13. The band-pass filters 40 or 41 or the absorbent absorbing effectively the light of wave-length 400–440 nm may be arranged between the liquid crystal display panel and a viewer of the liquid crystal display. The color filter may includes the absorbent absorbing effectively the light of wave-length 400–440 nm. The absorbent absorbing effectively the light of wave-length may be included by a blue color filter or an overcoat layer of the color filter.

What is claimed is:

1. A liquid crystal display for displaying an image to be visible for a viewer, comprising:

a liquid crystal;

a pair of electrodes for controlling an orientation of at least a part of the liquid crystal in accordance with an electric field between the electrodes;

a light source for generating a light to be transmitted through the liquid crystal to the viewer;

a pair of first and second polarizer plates, the first polarizer plate being arranged between the liquid crystal and the light source, and the second polarizer plate being arranged between the liquid crystal and the viewer; and an absorber arranged between the light source and the viewer for absorbing a component of the light having a wavelength which is not more than 440 nm and having a permeability for the component of the light having the wavelength of not more than 440 nm which is smaller than a permeability for another component of the light having a wavelength which is not less than 450 nm.

2. A liquid crystal display according to claim 1, wherein the absorber includes a band-pass filter for absorbing the component of the light, wherein a permeability of the band-pass filter for the component is smaller than a permeability of the band-pass filter for the another component of the light.

3. A liquid crystal display according to claim 1, wherein the absorber includes a color filter having a portion for transmitting therethrough a blue light, wherein the portion includes an agent for absorbing the component of the light, and a permeability of the agent for the component of the light is smaller than a permeability of the agent for the another component of the light.

4. A liquid crystal display for displaying an image to be visible for a viewer, comprising:

a liquid crystal;

a pair of electrodes for controlling an orientation of at least a part of the liquid crystal in accordance with an electric field between the electrodes;

a light source for generating a light to be transmitted through the liquid crystal to the viewer;

a pair of first and second polarizer plates, the first polarizer plate being arranged between the liquid crystal and the light source, and the second polarizer plate being arranged between the liquid crystal and the viewer; and a color filter including a portion for transmitting therethrough a blue light, the portion including an agent for absorbing a component of the light having a wavelength which is not more than 440 nm and having a permeability for the component of wavelength of not more than 440 nm which is smaller than a permeability for another component of the light having a wavelength which is not less than 450 nm.

5. A liquid crystal display according to claim 4, wherein the color filter is arranged between the light source and the viewer.

* * * * *